(12) United States Patent
Chen (10) Patent No.: US 10,574,586 B2
(45) Date of Patent: Feb. 25, 2020

(54) METHOD AND SYSTEM FOR SELF-ADAPTIVE BANDWIDTH CONTROL OF CDN PLATFORM

(71) Applicant: WANGSU SCIENCE & TECHNOLOGY CO., LTD., Shanghai (CN)

(72) Inventor: Weicai Chen, Shanghai (CN)

(73) Assignee: WANGSU SCIENCE & TECHNOLOGY CO., LTD, Shanghai (CN)

(*) Notice: Subject to any disclaimer, the term of this patent is extended or adjusted under 35 U.S.C. 154(b) by 92 days.

(21) Appl. No.: 15/769,610

(22) PCT Filed: Sep. 4, 2016

(86) PCT No.: PCT/CN2016/097987
§ 371 (c)(1),
(2) Date: Apr. 19, 2018

(87) PCT Pub. No.: WO2017/113868
PCT Pub. Date: Jul. 6, 2017

(65) Prior Publication Data
US 2018/0316623 A1    Nov. 1, 2018

(30) Foreign Application Priority Data
Dec. 29, 2015 (CN) .......................... 2015 1 1009412

(51) Int. Cl.
*H04L 12/917* (2013.01)
*H04L 29/08* (2006.01)
(Continued)

(52) U.S. Cl.
CPC .......... *H04L 47/76* (2013.01); *H04L 41/0896* (2013.01); *H04L 41/16* (2013.01);
(Continued)

(58) Field of Classification Search
CPC . G06F 3/04847; H04L 41/0896; H04L 41/16; H04L 47/76; H04L 65/4084; H04L 67/2852
See application file for complete search history.

(56) References Cited

U.S. PATENT DOCUMENTS 9,774,889 B2 * 9/2017 Gavade ............ H04N 21/43615
2004/0117427 A1   6/2004 Allen et al.
(Continued)

FOREIGN PATENT DOCUMENTS

CN    101150421 A    3/2008
CN    101242432 A    8/2008
(Continued)

OTHER PUBLICATIONS

The European Patent Office (EPO) The Extended European Search Report for PCT/CN2016097987 dated Oct. 23, 2018 10 Pages.
(Continued)

*Primary Examiner* — Mohamed A. Wasel
(74) *Attorney, Agent, or Firm* — Anova Law Group, PLLC (57) ABSTRACT

A method includes: configuring parameters for a self-adaptive task and sending the parameters to a control center; performing a task registration of the self-adaptive task according to the parameters; assigning the range for CDN service resources to a proxy; sending a data collection command to CDN service resources within the range; sending the collected data to the control center; generating a self-adaptive control line according to the collected data; generating a control command for the proxy according to the self-adaptive control line; generating a control policy for each of the CDN service resources, and allocating the control policy to a corresponding CDN service resource.

10 Claims, 4 Drawing Sheets

(51) Int. Cl.
*H04L 12/24* (2006.01)
*H04L 29/06* (2006.01)
*G06F 3/0484* (2013.01)

(52) U.S. Cl.
CPC .......... *H04L 65/4084* (2013.01); *H04L 65/80* (2013.01); *H04L 67/28* (2013.01); *H04L 67/289* (2013.01); *H04L 67/2852* (2013.01); *G06F 3/04847* (2013.01); *H04L 67/10* (2013.01)

(56) References Cited

U.S. PATENT DOCUMENTS

| | | | |
|---|---|---|---|
| 2009/0163183 A1* | 6/2009 | O'Donoghue | G06Q 30/02 455/414.1 |
| 2010/0153579 A1* | 6/2010 | Agraharam | G06F 9/542 709/235 |
| 2012/0066366 A1* | 3/2012 | Blaisdell | H04W 48/18 709/223 |
| 2014/0226711 A1* | 8/2014 | Ramamoorthy | H04N 19/40 375/240.02 |
| 2014/0258546 A1 | 9/2014 | Janssens et al. | |
| 2014/0344425 A1 | 11/2014 | Varney et al. | |
| 2015/0032854 A1 | 1/2015 | Wang et al. | |
| 2015/0127844 A1* | 5/2015 | Phillips | H04L 65/601 709/231 |
| 2015/0127845 A1* | 5/2015 | Phillips | H04L 65/601 709/231 |
| 2015/0263916 A1* | 9/2015 | Phillips | H04L 43/08 709/224 |
| 2015/0304187 A1* | 10/2015 | Brown | H04L 47/801 715/736 |
| 2016/0188821 A1* | 6/2016 | Ozeran | G16H 50/20 705/3 |

FOREIGN PATENT DOCUMENTS

| | | |
|---|---|---|
| CN | 104660700 A | 5/2015 |
| CN | 104994123 A | 10/2015 |
| CN | 105634992 A | 6/2016 |
| WO | 0235799 A2 | 5/2002 |

OTHER PUBLICATIONS

The World Intellectual Property Organization (WIPO) International Search Report for PCT/CN2016/097987 dated Nov. 25, 2016 5 Pages.

* cited by examiner

METHOD AND SYSTEM FOR SELF-ADAPTIVE BANDWIDTH CONTROL OF CDN PLATFORM

CROSS-REFERENCES TO RELATED APPLICATIONS

This patent application is a national phase entry under 35 U.S.C § 371 of PCT Application No. PCT/CN2016/097987 filed on Sep. 4, 2016, which claims priority of Chinese patent application No. 201511009412.2, filed on Dec. 29, 2015, the entire content of all of which is incorporated herein by reference.

FIELD OF THE DISCLOSURE

The present disclosure generally relates to the field of self-protection of content delivery network (CDN) and, specifically, relates to the self-protection method and system for the self-adaptive bandwidth traffic control.

BACKGROUND

Many internet-based service providers deliver digital content to clients around the world. The digital content can include web objects (e.g., text, graphics, URL, and script), downloadable objects (e.g., media files, software, and documents), web applications, stream media (e.g., audio and video contents), etc. Providing digital contents to a large number of clients in various geographical locations can be challenging to the service providers. For example, a service provider may not be able to provide sufficient server resources and/or network bandwidth to serve all the clients requesting for digital contents within a certain amount of time. In addition, because the traffic, between the service provider and a client geographically remote from the service provider, requires routing through a large number of internet servers across a great geographical distance, the client may experience a high-level wait time and/or low transfer rate.

To solve the abovementioned problems, a CDN technology has been provided. The full name of CDN is content delivery network. The goal of the technology is, by adding a new network architecture in the conventional internet, to publish the content of the website to an "edge" of the network that is the closest to the user, so that the user may obtain the desired content at a nearest location and the network congestion in the internet may be solved. The response time when the user accesses the website can be improved. Slow response when a user accesses the website caused by reasons such as a small network bandwidth, a great number of user accesses, and a non-uniformed distribution of network nodes, can be solved comprehensively in technic. CDN is a distributed network that is established on a bearer network and is formed by service nodes distributed in different regions. It transfers source content to the edge closest to a user using certain rules, such that the user can obtain the content from a nearest location, thereby reducing the requirements on the bandwidth of the backbone network and increasing the response speed of website to the user's access. It can be shown from the description of the CDN technology that, by using CDN technology, information from a remote data center may be transferred to a local server, and the task may be completed when a local user accesses the local server. Simply speaking, the CDN is a strategic deployment of an overall system, including four important elements i.e., distributed storage, load balancing, network request redirection, and content managing. The content managing and the global network traffic managing (Traffic Management) are the core of the CDN. By determining the user proximity and the server load, CDN can ensure the content based on a user's request is provided as service in a highly efficient manner. In general, content service is based on caching servers, also known as proxy caches. A proxy cache may be located on an edge of a network, and is only a "Single Hop" away from the user. Meanwhile, a proxy cache is a transparent mirror of the source server (often located at the data center of the CDN service provider) of the content provider. This architecture enables the CDN service providers to represent their clients, i.e., content providers, and to provide better experience for the ultimate user. These users do not tolerate any delay in response time of requests. According to statistics, by using CDN technology, approximately 70%-95% of the content access to the entire website may be processed, the pressure on the servers can be reduced, and the performance and the scalability of the website can be improved.

However, with the increasing popularity of CDN technology, CDN service becomes more and more complex. Thus, the mixed use of the bandwidth resources of service and the machine resources is very common. Conventional CDN technology is no longer suitable for current network usage environment. For example, in conventional CDN, to ensure the security of the CDN platform and prevent clients from using too much bandwidth, leading to the exhaustion of CDN resources and affecting all the clients on the platform, CDN bandwidth control lines for accelerating the client may be configured in advance on the platform. The threshold values of the control lines are often determined through static planning configuration after communicating with the clients. After the control lines are configured, when the bandwidth usage in the CDN platform exceeds the bandwidth control lines, the CDN technology provides one of the various control modes, e.g., direct disconnection, returning to client source station, and slow connection, based on the static planning configuration, for bandwidth control, so that the bandwidth usage may be reduced to ensure the normal service of the platform. However, the abovementioned conventional control line mechanism may cause the CDN platform, when still being able to provide service, to stop part of the service because of the limitation of the previously planned control lines, to solve the bandwidth problem. Thus, the use of CDN resources cannot be maximized. Especially, a sudden increase in business volume or a temporary increase in business volume of one client may cause the entire CDN platform to have decreased service resources and decreased service capacity. As a result, many other clients on the platform may also be affected.

In another aspect, for traditional CDN control methods used in industry, bandwidth-affecting factors taken into account when allocation values are commanded are relatively simple. Often, only factors such as bandwidth or traffic are taken into account. Thus, the allocation may deviate largely from the practical usage conditions, causing some resources to be overloaded and some resources to be too idle. The unreasonable allocation of resources seriously affects the security and stability of the CDN platform.

Lastly, with the development of network technology, CDN resources are becoming more and more widely distributed. The number of machines used for CDN is increasing. Thus, many aspects, such as the timeliness of data collection, policy generation, and control allocation, no longer satisfy the needs of CDN platform. As a result, the network bandwidth cannot be sufficiently controlled in real-time or be controlled with sufficient precision.

Thus, a CDN platform needs to possess a certain level of self-protection capacity. A solution that performs self-adaptive control on the CDN platform under the abovementioned conditions, to prevent affecting other clients or to reduce the number of clients being affected to the maximum extent, is needed. The solution must take into account more bandwidth-affecting factors and may have good timeliness.

BRIEF SUMMARY OF THE DISCLOSURE

The technical problem to be solved by the present disclosure is to provide a method and a system for self-adaptive bandwidth control of a CDN platform. Thus, the present disclosure provides a good self-protection capacity to the CDN platform.

One aspect of the present provides a method for self-adaptive bandwidth control of a CDN platform, including:

configuring corresponding parameters for a self-adaptive task through a UI platform and sending the parameters to a control center;

performing, by a proxy of a plurality of proxies, a task registration on the control center;

after receiving the task registration from the proxy, assigning, by the control center, a range for proxy-controllable CDN service resources to the proxy;

based on the range for proxy-controllable CDN service resources, sending, by the proxy, a data collection command to CDN service resources within the range;

after receiving the data collection command, returning, by the CDN service resources, real-time data to the proxy that sends the data collection command;

sending, by the proxy, collected data to the control center;

gathering, by the control center, the collected data, and generating, by the control center, a self-adaptive control line through data analysis;

based on collected data from each CDN service resource combined with the control line, generating, by the control center, a control command for the proxy; and after receiving the control command, performing, by the proxy, a self-learning and adjustment to generate a control policy for each proxy-controllable CDN service resource, and allocating, by the proxy, the control policy to a corresponding CDN service resource.

Another aspect of the present disclosure provides a system for self-adaptive bandwidth control of a CDN platform, including:

a UI platform, for configuring corresponding parameters for a self-adaptive task and sending the parameters to a control center;

a plurality of CDN service resources, for providing CDN service;

one or more proxies, for controlling one or more of the plurality of CDN service resources;

the control center, configured to:

after receiving a task registration from a proxy, assign a range for proxy-controllable CDN service resources to the proxy;

gather data collected by the proxy and generate a self-adaptive control line through data analysis;

based on collected data from each CDN service resource combined with the control line, generate a control command.

The proxy is configured to:

perform the task registration on the control center;

send a data collection command to CDN service resources within the range, based on the range for proxy-controllable CDN service resources sent by the control center;

send the collected data to the control center; and after the control center receives the control command, perform a self-learning and adjustment to generate a control policy for each proxy-controllable CDN service resource, and allocate the control policy to a corresponding CDN service resource.

The CDN service resources are configured to:

after receiving the data collection command, return real-time data to the proxy that sends the data collection command.

The summary is provided to introduce, in a simplified form, some concepts, which will be further described in the following detailed description. This summary is not intended to identify key features or essential features of the claimed subject matter, nor is it intended to help determine the scope of the claimed subject matter.

BRIEF DESCRIPTION OF THE DRAWINGS

To describe the manner in which the above and other advantages and features of the present disclosure are obtained, a more specific description of the disclosure briefly described above will be presented by reference in connection of specific embodiments of the disclosure illustrated in the accompanying drawings. It is to be understood that these drawings depict only typical embodiments of the present disclosure and are not intended to limit the scope of the present disclosure. The disclosure will be described and illustrated by the use of the accompanying drawings and additional features and details. In the drawings.

DETAILED DESCRIPTION

The present disclosure is further illustrated in connection of the drawings and the embodiments.

Figure 1:
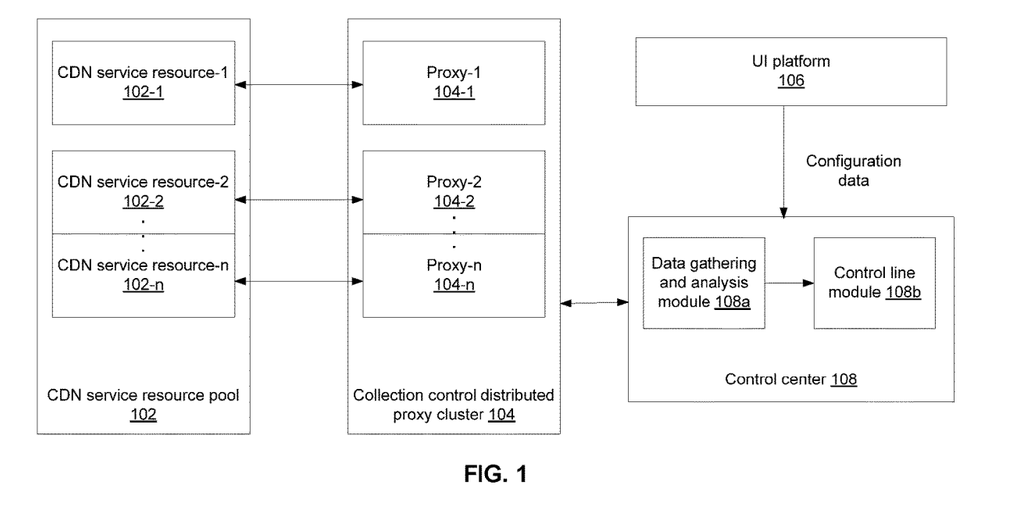
FIG. 1 illustrates an exemplary system structure consistent with the disclosed embodiments of the present disclosure.

Firstly, the system environment of the embodiments of the present disclosure is illustrated. FIG. 1 illustrates the system structure to implement the embodiments of the present disclosure.

As shown in FIG. 1, the system platform of the present disclosure may mainly be formed by a CDN service resource pool 102, a collection control distributed proxy cluster 104, a UI platform 106, and a control center 108. The CDN service resource pool 102 may include a plurality of CDN service resources 102-1, . . . , and 102-*n*. The proxy cluster 104 may include a plurality of proxies 104-1, . . . , and 104-*n*. It should be noted that the CDN service resources 102-1, . . . , and 102-*n*, and proxies 104-1, . . . , and 104-*n* may include any numbers of CDN service resources and proxies, and should not be limited by the quantities shown in the figure. The data center 108 may include a data gathering and analyzing module 108*a* and a control line module 108*b*.

In the system platform, the CDN service resources may refer to various resources used to provide CDN services, such as servers and websites. In the present disclosure, the self-adaptive control of the CDN resources is configured to reasonably allocate the CDN service resources so as to provide self-protection capacity for the CDN platform.

The UI platform 106 may provide a unified configuration portal and function operation interface. The UI platform may be used to automatically connect a plurality of modules in the entire system, so as to control the entire system for self-adaptive bandwidth control. A user may manage the configuration, operation, and maintenance of the entire system through the UI platform.

A proxy is often located on an edge of a network, thus, it may also be referred to as an edge proxy. A proxy may perform a task registration on the control center 108, and obtain, by registration, the CDN service resources that need to be controlled from the control center. Also, when a proxy malfunctions, the proxies may automatically perform task scheduling, to ensure all the service resources are allocated to proxies to be controlled. The registration process by the proxy may be further illustrated in detailed in FIG. 2. Further, the proxy may perform corresponding data collection and combination for the proxy-controllable CDN service resources, and may transfer the processed data, through an optimized UDP protocol, to the control center 108.

The control center 108 may, in real-time, collect the data of a machine data set collected and gathered by the proxies. The data gathering and analyzing module 108*a* may, in real-time, gather and analyze various factors contained in the data, and calculate data such as the redundant ratio data of a resource and the bandwidth growth ratio of a client channel. The control center 108 may compare the data with the corresponding ratios configured on the UI. If the comparison result satisfies the set comparison result, the control line module 108*b* may generate a self-adaptive control line. The data gathering and analysis may be further illustrated in detail in FIG. 3. Then, the control center 108 may finally generate the control command required by each CDN service resource in the CDN service resource pool 102 based on the generated self-adaptive control line, and finally allocate the task and the control command to all the proxy servers located on the edge based on the range for proxy-controllable CDN service resources. After a proxy at the edge receives the task allocated by the control center 108, the proxy may process the task and further generate a corresponding control policy. The proxy may allocate the task and the control policy to the corresponding CDN service resources to realize the self-protection of the CDN platform.

After briefly illustrating the system structure and basic principles of the present disclosure in connection with FIG. 1, each key point is further illustrated in detail as follows.

Proxy Registration

Figure 2:
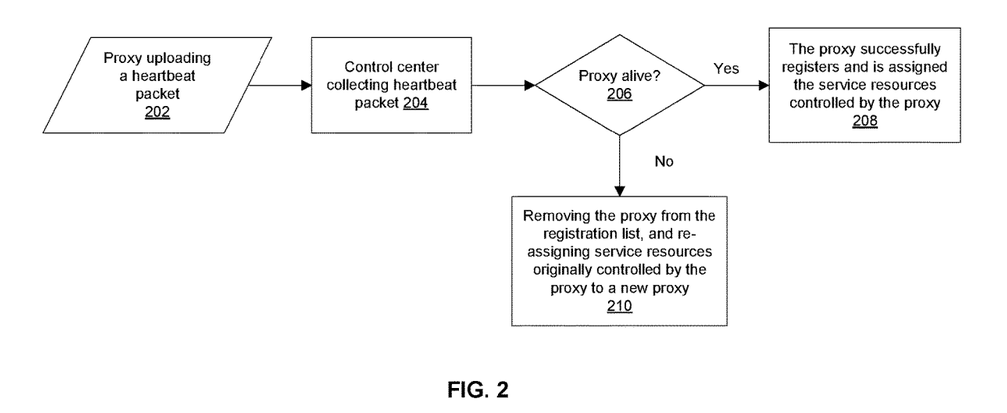
FIG. 2 illustrates an exemplary flow chart of proxy registration consistent with the disclosed embodiments of the present disclosure.

FIG. 2 illustrates an exemplary flow chart of a proxy registration consistent with the disclosed embodiments of the present disclosure.

Firstly, all the proxies at the edge may implement node self-managing through the configuration of nodes (104-1, . . . , 104-*n*). Each self-managing machine (proxy) may actively upload a heartbeat packet containing the operation status and load condition of the machine, to the control center 108, as shown in step 202. In step 204, the control center 108 may further collect the heartbeat packets. Also, in step 206, by determining whether the difference, between the time a latest heartbeat packet was uploaded and the current time, exceeds the configured expiration time of a heartbeat packet, it may be determined that whether the self-managing machine (proxy) that sends the heartbeat packet is still alive. For example, if the difference exceeds the expiration time of the heartbeat packet, it may be determined that the self-managing machine (proxy) is malfunctioning and is not able to upload the latest heartbeat packet. Thus, the self-managing machine (proxy) is not alive. The data content (e.g., whether the software is running OK) of the heartbeat packet may also be used to determine whether the proxy that sends the heartbeat packet is still alive.

If the proxy is alive, the process may proceed to step 208. In this step, the proxy registration may be successful. The control center 108 may, based on the configuration information planned on the CDN platform by the proxy, assign a range for proxy-controllable CDN service resources, to the proxy.

If the proxy is not alive (i.e., malfunctioning), the process may proceed to step 210. In this step, the control center 108 may remove the proxy from the CDN service resource task planned on the CDN platform, and may perform a diffusion search based on regional proximity principles to obtain other alive proxies for taking over the CDN service resources originally controlled by the malfunctioned proxy. Thus, the self-scheduling of the proxies may be realized.

Accordingly, the process of proxy registration may be completed herein.

Data Gathering and Analyzing

As described above, after a proxy has successfully registered with the control center 108, the proxy may obtain the range for proxy-controllable CDN service resources from the control center 108. Further, the data gathering and analyzing process shown in FIG. 3 may be executed.

Figure 3:
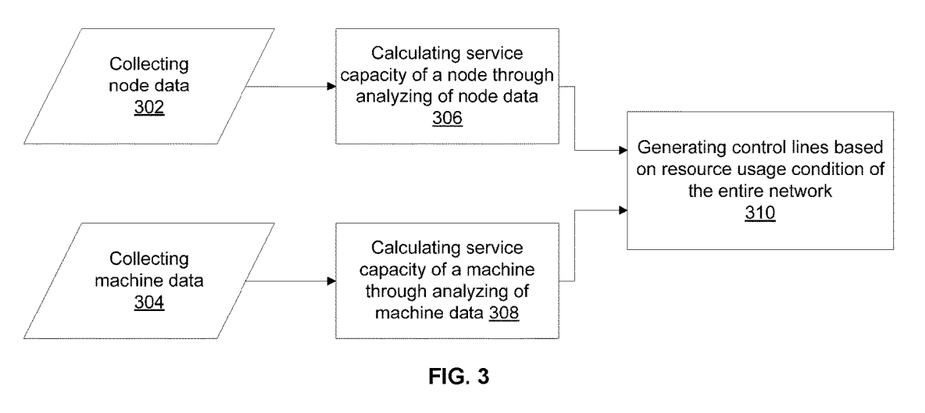
FIG. 3 illustrates an exemplary flow chart of data gathering and analysis consistent with the disclosed embodiments of the present disclosure.

Firstly, in step 302, the proxy may collect data from a switch of a node of CDN service resources, to obtain the real-time bandwidth data (e.g., real-time bandwidth value) of the node.

In step 304, the proxy may collect the data on the server containing the CDN service resources, to obtain machine data of the server such as the real-time bandwidth, software health condition, and various physical properties (e.g., information of CPU, memory, and load)

In step 306, for each node, the planned expected available bandwidth value may be stored on the CDN platform. By comparing and analyzing the stored expected available bandwidth value and the collected real-time bandwidth value of the node, underwent a smoothing process, the service capacity of each node may be calculated.

In step 308, based on the machine data of the server, e.g., real-time bandwidth, health value, and various physical properties, the proportions of impact on the machine may be comprehensively analyzed to calculate the machine service capacity of each server.

In step 310, after collecting the data of the CDN resource node and the machine service capacity, big data analysis may be performed through the client channel and the association relation between the client channel and its usage of resources. After the analysis, if ratios such as the redundant ratio value of the client channel resource and the bandwidth increase ratio value of the client channel already satisfy the redundant ratio value or bandwidth increase ratio value configured on the UI, a control line (also known as self-adaptive control line) may be generated based on the current bandwidth capacity of the channel.

Based on the generated control lines, the control center 108 may combine the data collected from each CDN service resource to generate a control command for each proxy and allocate the control command to each proxy machine.

Generation of Control Policies

Figure 4:
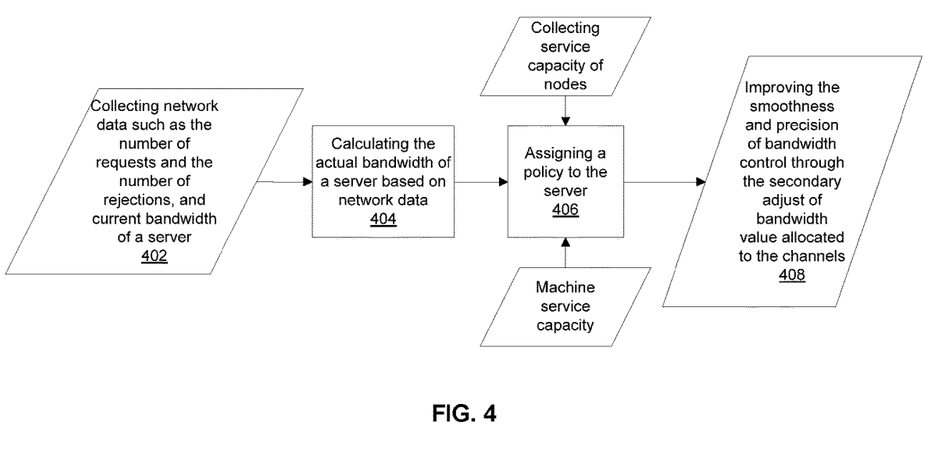
FIG. 4 illustrates an exemplary flow chart of generation of a control policy consistent with the disclosed embodiments of the present disclosure.

After generating the self-adaptive control lines for the channels, control policies may be distributed for the CDN server based on the generation of control policies shown in FIG. 4, according to the disclosed embodiments.

Firstly, in step 402, a proxy may, based on the range for proxy-controllable CDN service resources distributed by the control center 108 to the proxy, collect network data such as the number of requests and the number of rejections, and the current bandwidth, of each CDN server.

In step 404, the proxy may analyze and calculate an actual bandwidth of the CND server using a forecasting algorithm, based on the network data including the number of requests, the number of rejections, and the current bandwidth. For example, the bandwidth brought by each request may be forecasted based on historical request condition, to predict the actual bandwidth based on network data such as the number of requests, the number rejections, and the current bandwidth, if no rejection has occurred. Also, model matching of the historical bandwidth and support vector regression (SVR) may be used to forecast the growth trend of the bandwidth.

In step 406, the proxy may perform a self-learning and adjustment process to generate a control policy for each proxy-controllable CDN service resource, based on a calculated actual bandwidth, data of allocated control command in history, and a final control condition. For example, based on the calculated actual bandwidth of the channel on the CDN server, the service capacity of the node containing the server set, and the machine service capacity of the server set (referring to steps 306 and 308 in the process shown in FIG. 3), a control policy may be assigned to the server set. The policy may include a bandwidth control value. After the policy is allocated to a self-managing machine, the self-managing machine may, based on the bandwidth and load capacity of each machine in the server set, collected in real-time, properly distribute the bandwidth control policy values among the machines. Finally, each server may be assigned a final allocated control value.

That is, after generating the control policy, the control policy may be allocated to corresponding CDN service resources to realize the self-protection of the CDN platform.

Besides the abovementioned steps, in some embodiments, the self-learning and adjustment process may include: for a task in a control process, ensuring a smoothness of the control process through a secondary adjustment of bandwidth values assigned to channels including policy allocation analysis and controlling of control value fluctuation window before and after the control process over a period of time, and ensuring an improved precision of the control process through a negative feedback learning. For example, to improve the smoothness and precision of the disclosed bandwidth control, the tasks being controlled may also be processed as follows: by taking into account the maximum value of the distributed control and the minimum value of the distributed control, configured in a period of time, the policy may be distributed. By setting a certain variation amplitude, large fluctuation of values, distributed before and after the control, may be prevented. Also, a negative feedback learning may be used. That is, after the distribution of control values, if the error, between the previously predicted value and the actual collected value after the control, is too large, the actual distributed control value may be targeted for adjustment to ensure the precision of the control.

After generating the policy of the CDN server based on the above process, the proxy may send the policy to the corresponding CDN server for bandwidth management.

Examples of Overall Operation

Figure 5:
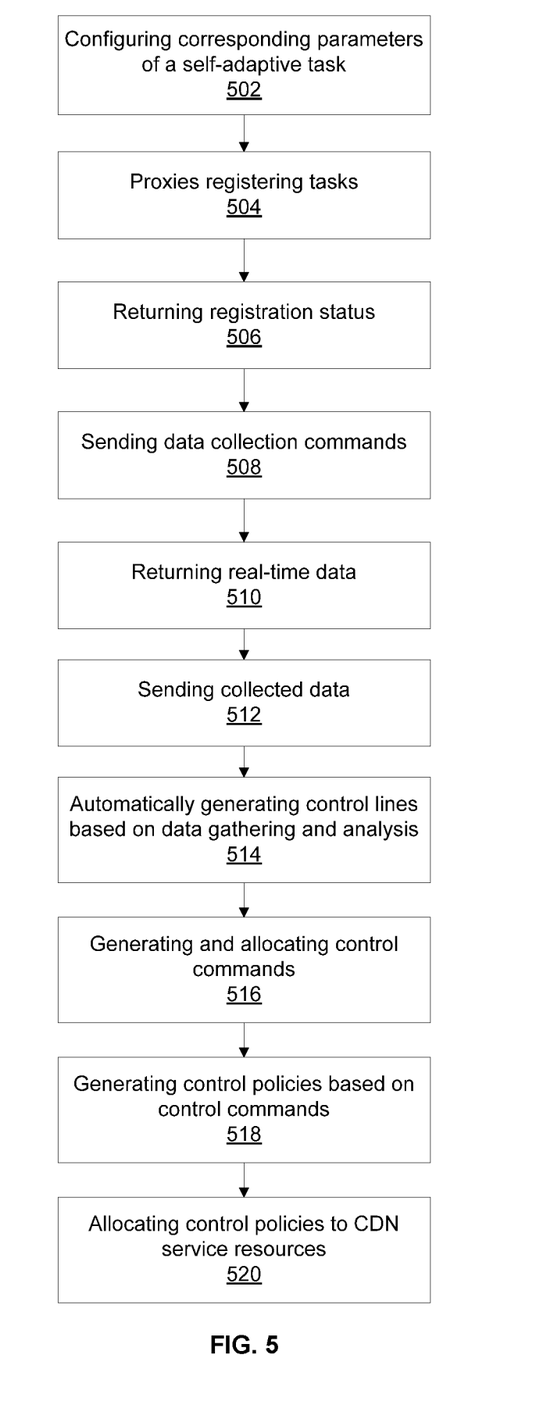
FIG. 5 illustrates an exemplary flow chart of overall operation consistent with the disclosed embodiments of the present disclosure.

After the description of aspects of the solution of self-adaptive bandwidth control of the CDN platform, the overall operation of the self-adaptive bandwidth control of CDN platform in the disclosed embodiments shown FIGS. 2-4 may be exemplified in FIG. 5.

Firstly, in step 502, the UI platform 106 may configure corresponding parameters of a self-adaptive task and may push the data, containing the configured related parameters, to the control center 108 after the configuration is completed.

Node self-managing technique may be applied on each node on an edge of the network, and each edge may be deployed with proxies (i.e., proxy servers). For example, often, each machine room may be arranged with one proxy machine, the plurality of proxy machines may form a collection control distributed proxy cluster 104. In step 504, each proxy in the proxy cluster may perform task registration on the control center 108. The specific process of the task registration by the proxies may be referred to the description of FIG. 2, and is not repeated herein.

After receiving the task registration request from a proxy, in step 506, the control center 108 may, based on the physical region properties (e.g., the province of the machine room where the machine is located), network status (e.g., the effect of access between nodes, often measured using ping delay and packet loss rate), machine status (machine data such as the usage of CPU and load), and whether the available status registered through the UI (e.g., man-made registration label of the platform) containing a usable status, distribute the corresponding range for proxy-controllable CDN service resources to the proxy, and use the range for proxy-controllable CDN service resources as the registration status data to return to the proxy.

The proxy on the edge, after receiving the registration status data returned by the control center 108, may obtain the information of the proxy-controllable CDN server resources assigned to the proxy, contained in the registration status data. Also, in step 508, the proxy may send data collection commands to the proxy-controllable CDN service resources through the defined data port.

In step 510, a CDN service resource 102-$n$ may, based on the collected data type contained in the data collection command sent by the proxy, return the real-time data to the proxy that sent the data collection command.

In step 512, the proxy may gather the collected data according to certain rules, and send the gathered collected data to the control center 108.

In step 514, the control center 108 may perform gathering and accumulation of the data of the entire network, and may, by applying data analysis, automatically generate corresponding control lines based on the resource usage by clients and the usage condition of the machines and nodes from the data after the gathering. The specific process of the data gathering and analysis may be referred to the previous detailed description of FIG. 3, and is not repeated herein. Because the control lines are dynamically generated based on data collected in real-time from the CDN service resources, thus, compared with the predetermined fixed control lines in conventional technology, the present disclosure may better enable the bandwidth allocation to match the actual network operation. The usage of the network resources may be improved.

Then, proceeding to step 516, the control center 108 may, based on control lines generated from combining the data collected from each CDN service resource, generate a control command for each proxy and allocate the control command to each proxy machine.

In step 518, after the proxy receives the corresponding control command, as long as the command is valid, the proxy may perform self-learning and adjustment based on the data collected in real-time, the allocated control command data in history, and the final control condition. Thus, control policy (e.g., control command) for each proxy-controllable CDN service resource, may be finally generated. The generation of the control policies may be described in the previous detailed description of FIG. 4, and is not repeated herein. However, if the control command has expired, the control command may be ignored, i.e., no control policy may be executed.

Lastly, in step 520, the proxy may finally allocate the control policies, e.g., in the form of control commands, to the CDN service resources that actually provide service, to realize the final self-adaptive bandwidth control effect.

In the above embodiments, compared to the conventional centralized control method used in the industry, the solution provided by the present disclosure uses the method in which the policies are generated in the control center and distributed control is applied on the edges. Also, the data transfer uses a protocol such as an improved stable transfer protocol, and the protocol is an independently developed transfer protocol supported by UDP. The protocol may perform router detection by fully using the resource advantage of CDN nodes. Thus, during data transfer, an optimized transfer path may be intelligently selected based on the condition of each router, to improve the timeliness and stability of the control.

By referring to FIG. 5, together with the process steps in FIGS. 2-4, the principles and specific implementation of the disclosed method for self-adaptive bandwidth control of CDN platform may be fully understood. Compared to conventional technology, the abovementioned method for self-adaptive bandwidth control includes the following advantages:

(1) The configuration of control lines need not be planned in advance, and short comings of planning control lines in advance and causing a waste of resources in the conventional technology, may be avoided. In the present disclosure, the capacity of a CDN service resource providing the service may be counted in real-time. When the capacity reaches the configured alarm standard, a control line may be automatically generated based on the service resource. Thus, possible platform collapse or a waste of resources, caused by unreasonably planned control lines by people, may be reduced. The usage of resources may be greatly improved, and greater profits may be created for CDN.

(2) Besides considering only the bandwidth or traffic, like in the conventional technology, the disclosed solution may also take into account the number of request and the number of rejections to forecast the actual traffic, and may consider the service capacity of the CDN servers. By combining various factors, the allocation may be more reasonable. Also, difference fluctuation control of the control values before and after the control may be performed. The actual difference between the allocated control value and the actual bandwidth value may be calculated and used in a negative feedback method for real-time self-learning. A relatively stable ratio coefficient may be calculated. The data may be used to adjust the control value in real-time. Also, after establishing the forecast module of the actual bandwidth, based on the bandwidth, the number of requests, and the number of rejections, the control values of bandwidth control may be used to improve the precision of control and reduce fluctuation. Especially, the control of small bandwidth and low traffic may have improved effect.

(3) In the disclosed solution, all the collection and policy allocation may be entirely automatic. By using proxy-based distributed collection and control policy allocation, the control center may further perform overall control. Also, the data transfer may use an improved stable UDP protocol. All the data may be stored in the memory and may not be stored in the form of files. Thus, the entire process from collection to policy allocation may be controlled within 30 seconds. The timeliness and reliability of the control may be greatly improved.

The disclosure may be embodied in other specific forms without departing from the spirit or essential characteristics thereof. The described embodiments are to be considered in all respects only as illustrative and not restrictive. Accordingly, the scope of the disclosure is indicated by the appended claims rather than by the foregoing description. All changes which come within the meaning and range of equivalency of the claims are to be embraced by the scope of the claims.

What is claimed is:

1. A method for self-adaptive task control of a content delivery network (CDN) platform, comprising:
   configuring parameters for a self-adaptive task through a user interface (UI) platform and sending the parameters to a control center;
   performing, by a proxy of a plurality of proxies, a task registration of the self-adaptive task on the control center according to the parameters, including;
      actively sending, by the proxy, a heartbeat packet to the control center;
      collecting, by the control center, the heartbeat packet, and determining, by the control center, whether the proxy that sends the heartbeat packet is still alive based on an expiration status and data content contained in the heartbeat packet;
      when it is determined that the proxy is alive, a proxy registration is successful, and the control center assigns a range for CDN service resources to the proxy; and
      when it is determined that the proxy is not alive, the control center removes CDN service resources previously controlled by the proxy;
   after receiving the task registration from the proxy, assigning, by the control center, the range for CDN service resources to the proxy;
   based on the range for CDN service resources, sending, by the proxy, a data collection command to CDN service resources within the range;
   collecting data to obtain collected data, by the CDN service resources in response to the data collection command;
   sending, by the proxy, the collected data to the control center;
   gathering, by the control center, the collected data, and generating, by the control center, a control line through data analysis including:
      collecting, by the proxy, data of nodes of the CDN service resources, and sending, by the proxy, collected data of the nodes to the control center; and calculating a service capacity of each of the nodes, by the control center, according to the collected data of the nodes;
      collecting, by the proxy, data of servers of the CDN service resources, and sending, by the proxy, collected data of the servers to the control center; and calculating a service capacity of each of the servers, by the control center, according to the collected data of the servers; and generating the control line, by the control center, according to the service capacity of each of the nodes and the service capacity of each of the servers;

based on collected data from each of the CDN service resources, generating, by the control center, a control command for the proxy; and after receiving the control command, generating, by the proxy, a control policy for each of the CDN service resources, and allocating, by the proxy, the control policy to a corresponding CDN service resource.

2. The method according to claim 1, wherein the generating, by the proxy, the control policy for each of the CDN service resources includes:

collecting, by the proxy, network data including a number of requests, a number of rejections, and a current bandwidth of each CDN server within the range for CDN service resources assigned by the control center to the proxy;

calculating, by the proxy, a bandwidth of the CDN server, based on the network data including the number of requests, the number of rejections, and the current bandwidth; and generating, by the proxy, the control policy based on the bandwidth as calculated.

3. The method according to claim 1, wherein collecting the data of nodes of the CDN service resources includes:

performing router detection using the nodes of the CDN service resources.

4. The method according to claim 1, further comprising:

after receiving the control command, determining, by the proxy, whether the control command has expired;

when the control command is still valid, the proxy executes a step of generating the control policy; and when the control command has expired, the proxy ignores the control command.

5. The method according to claim 2, further comprising:

assigning the control policy to the servers, based on the bandwidth as calculated and the service capacity of each of the servers.

6. The method according to claim 2, further comprising:

sending the control policy, by the proxy, to the corresponding CDN server for bandwidth management.

7. The method according to claim 2, further comprising:

distributing, by the control center, the range for CDN service resources to the proxy; and using the range for CDN service resources as registration status data to return to the proxy, by the control center, based on at least one of physical region properties, network status, and machine status.

8. A system for self-adaptive task control of a content delivery network (CDN) platform, comprising a memory and a processor coupled to the memory, the processor being configured to perform:

configuring parameters for a self-adaptive task through a user interface (UI) platform and sending the parameters to a control center;

performing, by a proxy of a plurality of proxies, a task registration of the self-adaptive task on the control center according to the parameters, including;

actively sending, by the proxy, a heartbeat packet to the control center;

collecting, by the control center, the heartbeat packet, and determining, by the control center, whether the proxy that sends the heartbeat packet is still alive based on an expiration status and data content contained in the heartbeat packet;

when it is determined that the proxy is alive, a proxy registration is successful, and the control center assigns a range for CDN service resources to the proxy; and when it is determined that the proxy is not alive, the control center removes CDN service resources previously controlled by the proxy;

after receiving the task registration from the proxy, assigning, by the control center, the range for CDN service resources to the proxy;

based on the range for CDN service resources, sending, by the proxy, a data collection command to CDN service resources within the range;

collecting data to obtain collected data, by the CDN service resources in response to the data collection command;

sending, by the proxy, the collected data to the control center;

gathering, by the control center, the collected data, and generating, by the control center, a control line through data analysis including:

collecting, by the proxy, data of nodes of the CDN service resources, and sending, by the proxy, collected data of the nodes to the control center; and calculating a service capacity of each of the nodes, by the control center, according to the collected data of the nodes;

collecting, by the proxy, data of servers of the CDN service resources, and sending, by the proxy, collected data of the servers to the control center; and calculating a service capacity of each of the servers, by the control center, according to the collected data of the servers; and generating the control line, by the control center, according to the service capacity of each of the nodes and the service capacity of each of the servers;

based on collected data from each of the CDN service resources, generating, by the control center, a control command for the proxy; and after receiving the control command, generating, by the proxy, a control policy for each of the CDN service resources, and allocating, by the proxy, the control policy to a corresponding CDN service resource.

9. The system according to claim 8, wherein the generating, by the proxy, the control policy for each of the CDN service resources includes:

collecting, by the proxy, network data including a number of requests, a number of rejections, and a current bandwidth of each CDN server within the range CDN service resources assigned by the control center to the proxy;

calculating, by the proxy, a bandwidth of the CDN server, based on the network data including the number of requests, the number of rejections, and the current bandwidth; and generating, by the proxy, the control policy based on the bandwidth as calculated.

10. The system according to claim 8, wherein collecting the data of nodes of the CDN service resources includes:

performing router detection using the nodes of the CDN service resources.

* * * * *